US007730418B2

(12) United States Patent
Wang et al.

(10) Patent No.: US 7,730,418 B2
(45) Date of Patent: Jun. 1, 2010

(54) SIZE TO CONTENT WINDOWS FOR COMPUTER GRAPHICS

(75) Inventors: Hua Wang, Bellevue, WA (US); Anup R. Manandhar, Bellevue, WA (US); Julia H. Farago, Seattle, WA (US); Mark A. Alcazar, Seattle, WA (US); Sujal S. Parikh, Redmond, WA (US); Hamid Mahmood, Redmond, WA (US)

(73) Assignee: Workman Nydegger, Redmond, WA (US)

( * ) Notice: Subject to any disclaimer, the term of this patent is extended or adjusted under 35 U.S.C. 154(b) by 736 days.

(21) Appl. No.: 11/121,572

(22) Filed: May 4, 2005

(65) Prior Publication Data

US 2006/0253796 A1 Nov. 9, 2006

(51) Int. Cl.
*G06F 3/048* (2006.01)
*G06F 3/00* (2006.01)

(52) U.S. Cl. .................. 715/800; 715/764; 715/781; 715/788; 715/700

(58) Field of Classification Search ................ 715/800, 715/788, 781, 273, 764, 700
See application file for complete search history.

(56) References Cited

U.S. PATENT DOCUMENTS

| | | | | |
|---|---|---|---|---|
| 5,227,771 A * | 7/1993 | Kerr et al. | .................... | 715/800 |
| 5,513,342 A * | 4/1996 | Leong et al. | ................ | 715/798 |
| 5,546,103 A * | 8/1996 | Rhodes et al. | .............. | 715/781 |
| 5,886,694 A * | 3/1999 | Breinberg et al. | ........... | 715/788 |
| 6,335,743 B1 * | 1/2002 | Owings | ....................... | 715/801 |
| 6,414,698 B1 * | 7/2002 | Lovell et al. | ................ | 715/800 |
| 7,165,228 B2 * | 1/2007 | Taylor et al. | ................. | 715/788 |
| 7,313,765 B2 * | 12/2007 | Taylor et al. | ................. | 715/788 |
| 7,343,567 B2 * | 3/2008 | Mann et al. | ................... | 715/826 |
| 7,370,284 B2 * | 5/2008 | Andrea et al. | ............... | 715/788 |
| 7,373,592 B2 * | 5/2008 | Allyn | .......................... | 715/211 |
| 7,426,697 B2 * | 9/2008 | Holecek et al. | ............. | 715/788 |
| 7,429,993 B2 * | 9/2008 | Hui | ............................ | 345/629 |
| 7,444,599 B1 * | 10/2008 | Chaudhri et al. | ............ | 715/830 |
| 2003/0025737 A1 * | 2/2003 | Breinberg | ................... | 345/801 |
| 2003/0182628 A1 * | 9/2003 | Lira | ............................ | 715/517 |
| 2005/0071755 A1 * | 3/2005 | Harrington et al. | .......... | 715/511 |
| 2005/0088452 A1 * | 4/2005 | Hanggie et al. | ............. | 345/581 |
| 2005/0091594 A1 * | 4/2005 | Parikh et al. | ................ | 715/700 |
| 2005/0235220 A1 * | 10/2005 | Duperrouzel et al. | ....... | 715/788 |
| 2006/0236264 A1 * | 10/2006 | Cain et al. | .................. | 715/788 |

(Continued)

OTHER PUBLICATIONS

IE Window Resizer, Interactive Tools, Apr. 9, 2001. Pages:2 (Provides interactive window resizing).*

*Primary Examiner*—William L Bashore
*Assistant Examiner*—David Phantana-angkool

(57) ABSTRACT

Described is a method and system by which a computer program window is sized based on the content to display. The window may automatically resize itself as content changes. When laying out an element tree of elements that contain the content, the elements provide desired size information to a parent container, and so on, up to the root element (e.g., a window). If a window property is set to size to the content, a window size is computed during layout, having a height and/or width based on the child elements plus X and Y deltas for a window non-client area and borders. Logic attached to window message handling controls changes to the content/window, such as to automatically resize for changed content, and to selectively turn off or persist the size to content property. Sizing to content may be programmatically limited to one dimension, with the other dimension fixed.

16 Claims, 8 Drawing Sheets

U.S. PATENT DOCUMENTS

2006/0248471 A1* 11/2006 Lindsay et al. .............. 715/800
2007/0136685 A1* 6/2007 Bhatla et al. ................ 715/800
2008/0052637 A1* 2/2008 Ben-Yoseph et al. ........ 715/800

* cited by examiner

SIZE TO CONTENT WINDOWS FOR COMPUTER GRAPHICS

FIELD OF THE INVENTION

The invention relates generally to computer systems, and more particularly to the display of graphical and other video information for programs on computer systems.

BACKGROUND

The term "layout" in user interface application platforms refers to the sizes and positions of user interface elements, such as text boxes, buttons, image boxes, and so forth. Layout has traditionally been a very difficult problem to solve. For example, layout needs logic to handle dynamic changes.

By way of example, consider when content that is currently being displayed changes in some way. This may be a result of user interaction with the window, a locale change where the user interface elements remain essentially the same but the language (and thus the text content) changes, an automatically timed or otherwise triggered update to the content, and so forth.

Heretofore, content that did not fit within a current window was handled in a number of ways to make it or some portion of it fit, including when the content changed. For example, if it was text content that changed, the text content may automatically wrap to fit in the current element (e.g., text box) within the window. For text that was unable to wrap, or for image data and the like, clipping is another alternative, including having vertical and/or horizontal scrollbars provided as necessary to allow the user to interactively view the entire content. Resizing the content (e.g., via scaling) to fit is another option.

While these solutions all provide a way to present content to users, there are drawbacks to each. For example, a user interface scene designer may not realize that a locale change will cause an element's (e.g., button's) text to not fit in the element when translated. Even in systems in which the elements can automatically resize to fit the text, this resizing may no longer fit the window. For example, after resizing, even a simple dialog window may require that the user scroll in order to view and interact with an item (e.g., a button). What is needed is another way for scene designers to present content to the users that overcomes these and other drawbacks.

SUMMARY OF THE INVENTION

Briefly, the present invention is directed towards a method and system by which a window is sized based the content that is being displayed. This may include having the window automatically resize itself as content changes.

In one implementation, a layout system is described in which content corresponds to elements in an element tree. As part of layout, the elements provide desired size information to a parent container, and so on, up to the root element (e.g., a window). In this manner, sizing information ultimately is obtained by a top-level window element that can adjust its size. A window property associated with the window handle (e.g., SizeToContent on HwndSource) may be selectively set to have the window resize to content when the property is in the correct state, as specified by a program, or possibly by the user.

Thus, for user interface functionality, a program receives a handle to a window for rendering user interface elements, wherein a window can include a main program window, a dialog, a pop-up and so forth. The program can set the SizeToContent property on the window. If set, the window will initially size to the content based on the size of each child element beneath the window element, and the window will resize as necessary as the content changes, and thus the element's desired size changes, for various reasons. To this end, when layout decisions are made, as performed by the elements and/or in conjunction with a layout system, the elements in the element tree are configured.

In general, at layout time, a panel or other child element of the window asks each of its child elements in a measure phase what the desired size of the child is, and possibly also receives positioning data. The children are thus able to size and resize themselves based on their current content, which allows for dynamically changing content. A child of the window, such as a panel, analyzes the desired sizes of its children and changes sizes and positions as necessary, e.g., based upon maximum and minimum size constraints. The panel returns a desired size to the window, whereby the window adjusts its size to comply with the desired size of the content. A window size is thus computed, having a height and/or width based on the child elements to be rendered in the window, plus possibly a small delta X for the window side borders, and a delta Y for a window caption area and a bottom border. The delta X and Y are based on the style of the window that is currently in use, and may be zero. If the requested size exceeds the maximum that the window can provide, vertical and/or horizontal scrollbars may be automatically provided.

The elements are then arranged in an arrange phase, after which representations of the elements at their arranged positions and with their arranged sizes are rendered. If any content's size changes, the content's containing element informs its parent in the tree, and so on up to the window element, whereby the window automatically readjusts its size to fit the changed content size, (subject to maximum and minimum constraints).

The window can be configured by the scene designer to resize both vertically and horizontally, or only in one horizontal or vertical dimension. Thus, a scene designer can specify a fixed height with a size-to-content width, a fixed width with a size-to content height, or both a size-to-content width and size-to-content width height.

In one implementation, the SizeToContent property is persisted in association with the window handle, so that, for example, if the window is minimized and then restored, the window still behaves the same way. Similarly, the size-to-content feature remains active if the window's style changes. The SizeToContent property also overrides other programmatic window size management function calls, unless the scene author explicitly turns off the SizeToContent property off. Certain types of user interaction to manually change the size, e.g., by maximizing the window or resizing by dragging the window edge or corner turns off the size to content property, giving a user the ability to manually size a window. An option (e.g., button) to restore the size-to-content feature via manual interaction may be provided. Logic in a hook of the window message handling mechanism implements the rules that properly handle changes to the content and/or the window, providing a window that sizes to content in an intelligent way.

Other advantages will become apparent from the following detailed description when taken in conjunction with the drawings, in which:

DETAILED DESCRIPTION

Exemplary Operating Environment

Figure 1:
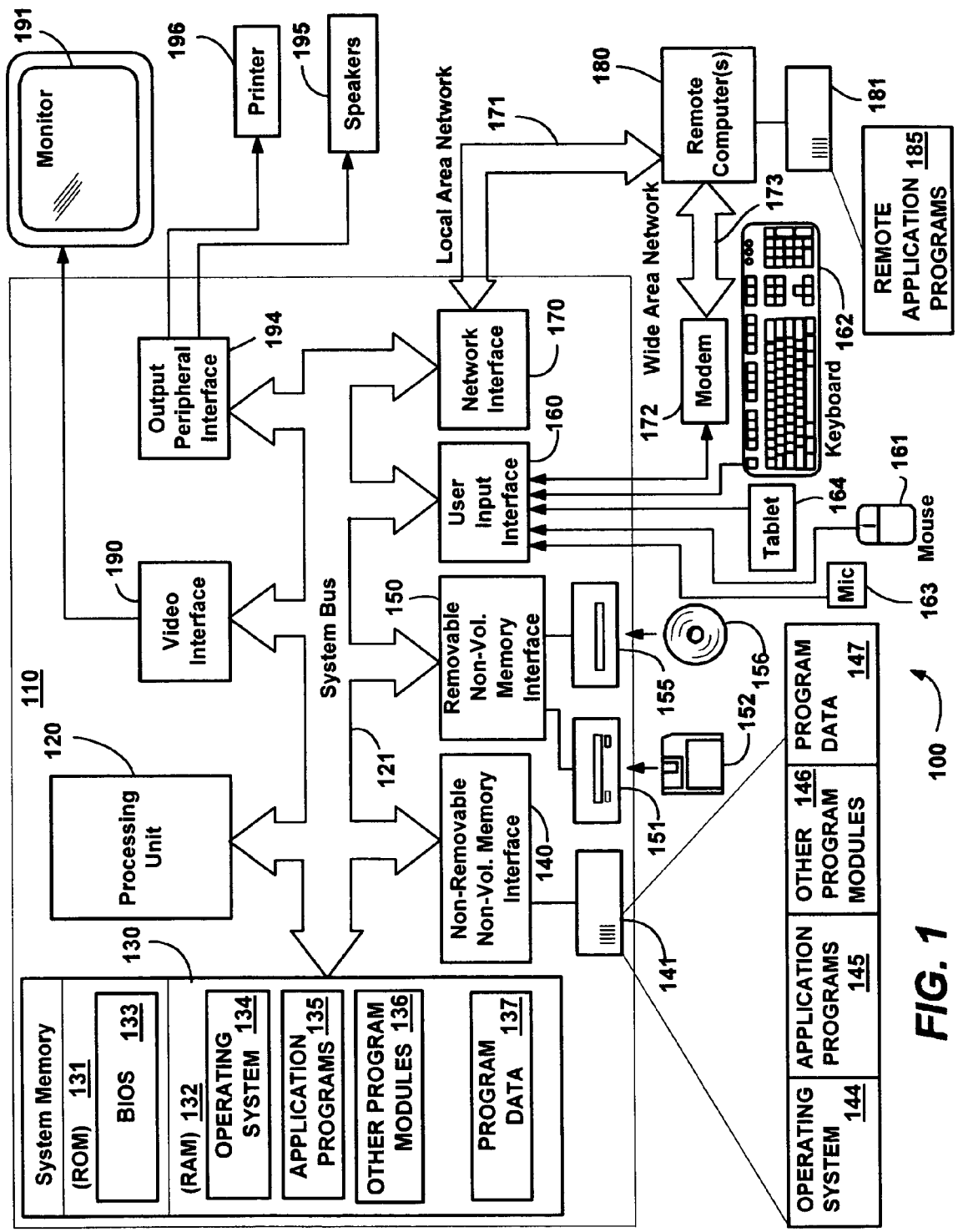
FIG. 1 is a block diagram generally representing a computing environment into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention also may be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 also may be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Size to Content Windows

The present invention is generally directed towards resizing a window to fit content, when specified by a program, including if the content changes. To this end, the present invention leverages layout system functionality in which scene designer-specified elements communicate desired size information to parent elements in an element tree, whereby sizing information ultimately is obtained by a top-level window element that can adjust its size. As will be understood, numerous ways to implement the present invention are feasible, and only some of the alternatives are described herein. For example, the present invention is primarily described below with reference to a window property associated with the window handle (e.g., SizeToContent on HwndSource) that may be selectively set to have the window resize to content as specified by a program when the property is in the correct state. However, it is also straightforward to have a mechanism that can set the property independent of and external to program control. Moreover, it is alternatively feasible to not have such a property, but instead allow a program request either a size-to-content window or a regular window. Still further, the present invention may function with any window handle-based controls and/or content. As such, the present invention is not limited to any particular examples used herein, but rather may be used various ways that provide benefits and advantages in computing in general.

Figure 2:
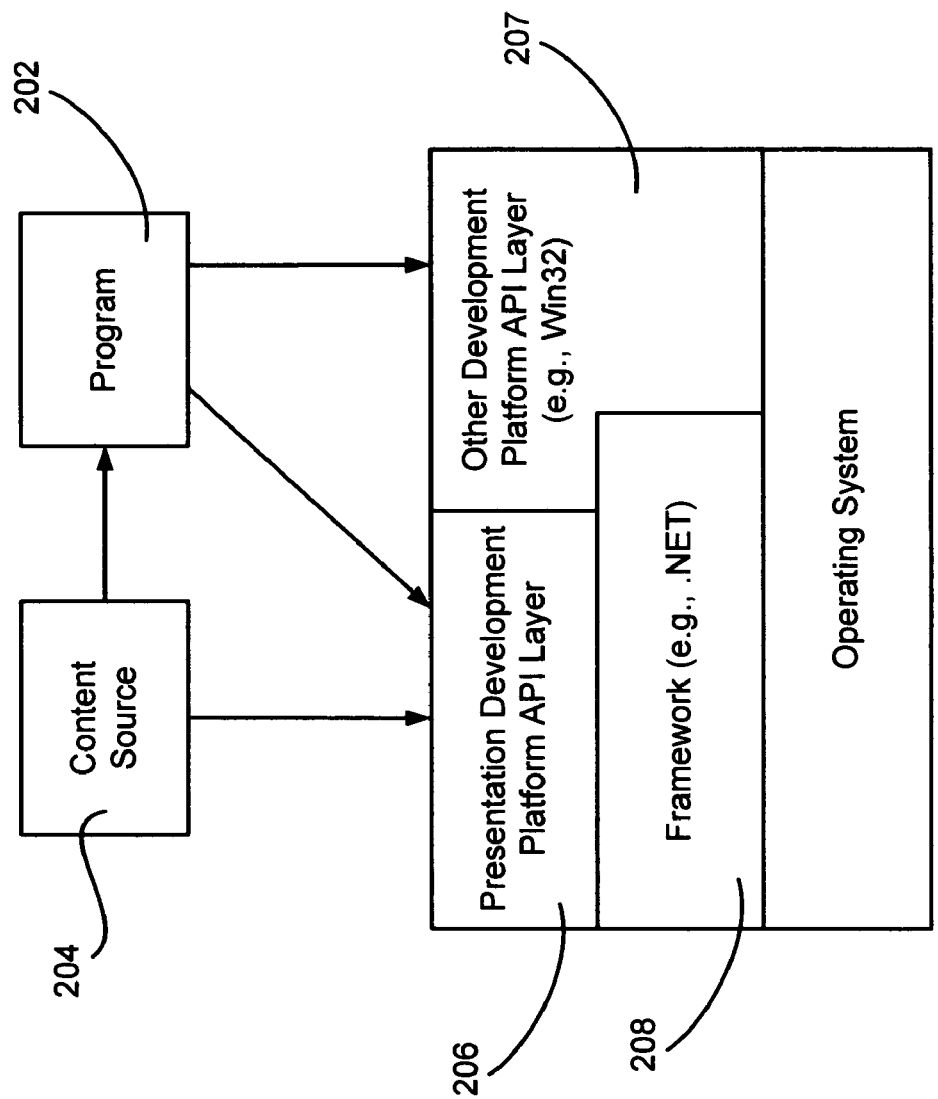
FIG. 2 is a block diagram representing an application program providing content from a source to an operating system via various interfaces, in which the content determines the sizing of a window of the application program in accordance with various aspects of the present invention.

FIG. 2 is a general representation of how a program 202 such as an application program, operating system component or other component, and a source of content 204, communicate data through various API layers and a framework 206-208, to an operating system 134. In general, for user interface functionality, the program 202 receives a handle, for each window requested, in a known manner. In this way, a program 202 can render data on a main program window, and also present dialogs, pop-ups and so forth. Note that the program can bind content to a source, so that, for example, the program can specify a source such as a URL, a string, a file and so forth for rendering corresponding content, rather than having to directly provide the content. As a result, the content can change, and thus its size can change, for various reasons including those referred to above. The program may also change content at any time.

Figure 3:
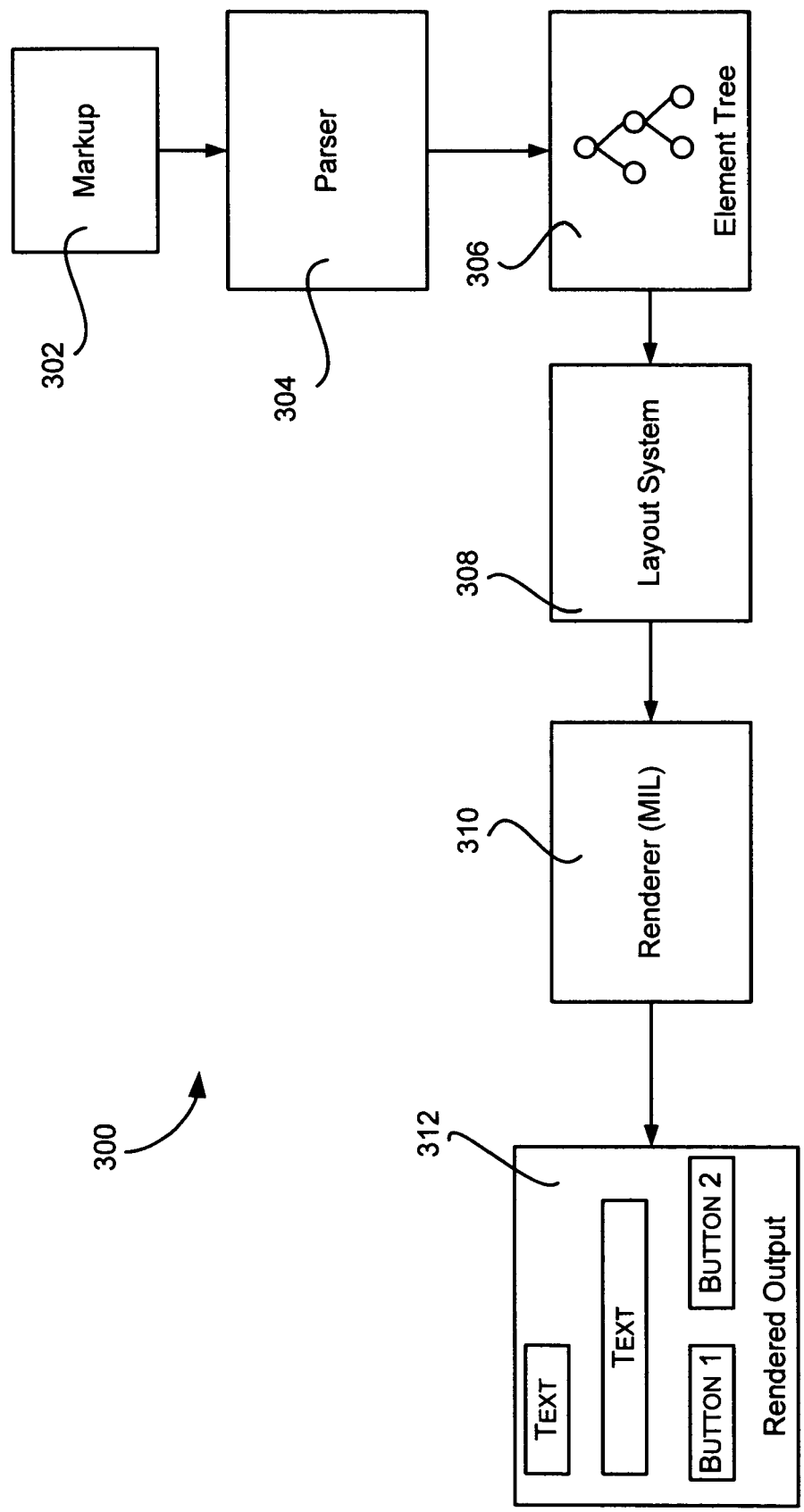
FIG. 3 is a block diagram including a general user interface rendering architecture, including a layout and property system configured in accordance with various aspects of the present invention.

Turning to FIG. 3, there is shown an example architecture 300 for rendering user interface elements. In general, a scene designer provides code (e.g., markup 302 of a suitable markup language) to cause user interface elements to be rendered as specified by the scene designer. For example, via markup, a scene designer may specify that a button should appear on the screen with certain parameters such as color, border, text and/or other appearance information. From this markup 302, a parser 304 constructs an element tree 306 of elements. The tree may have a number of parent and child elements, and a parent may be a container for one or more child elements, e.g., a parent menu bar may have child icons positioned therein. A child may be a parent of another child. Essentially, a window is at the top of the tree. Note that the element tree can be built from other languages, such as C-based programming languages, and thus markup is not necessary to the present invention.

Once layout decisions are made, performed by the elements and/or in conjunction with a layout system 308, the elements in the element tree 306 are properly configured. A renderer component 310 (of a media integration layer, or MIL) takes data from the element tree 306, including the sizes and positions, drawing primitives and other information, and renders the user interface elements to a suitable display. For example, in FIG. 3, the rendered output 312 includes text boxes and buttons as user interface elements, which are rendered representations of elements in the tree.

Figure 4:
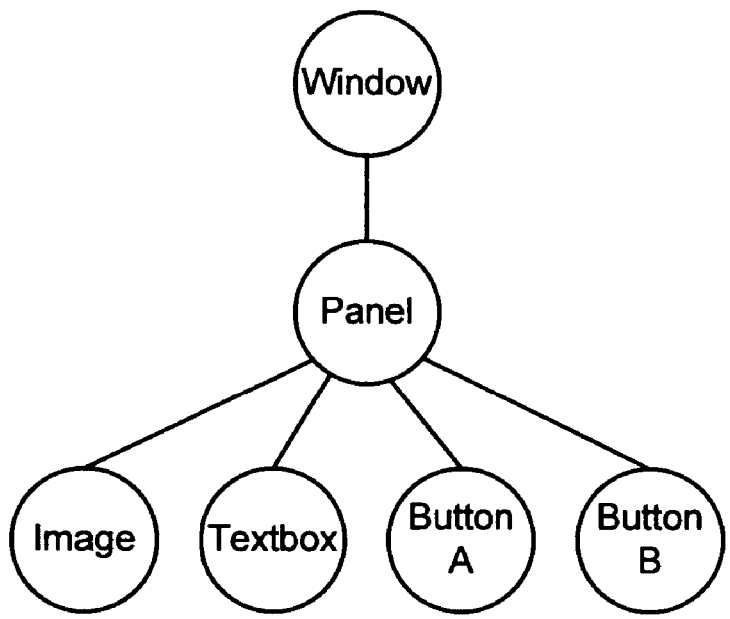
FIG. 4 is a representation of an element tree having a window container with lower-level elements including elements for at least some variable content that resizes a corresponding window in accordance with various aspects of the present invention.

FIG. 4 is a representation of one such element tree that provides a simple example of how layout works. In general, at layout time, a panel or other child element of the window asks each of its child elements in a measure phase what the desired size of the child is, and possibly also receives positioning data. Note that the children are thus able to size and resize themselves based on their current content, which allows for dynamically changing content. Further, note that FIG. 4 is only one example implementation, in which the window element can have only one direct child; it is feasible to have an implementation in which the window may have multiple children directly beneath it, without the panel element as in the example of FIG. 4.

In the implementation of FIG. 4, the panel then analyzes the desired sizes of its children, e.g., possibly subject to maximum and minimum size constraints, changes sizes and positions as necessary.

In accordance with an aspect of the present invention, for sizing a window to the content, the window analyzes the desired size of its child (the panel), which likewise may be subject to the minimum and maximum constraints. In this manner, the window adjusts its size to comply with the desired size of the content. Note that a child window may set the size of its container window (e.g., a browser control) so that the container window sizes to content. Further, note that if the requested size exceeds the maximum that the window can provide, vertical and/or horizontal scrollbars may be automatically provided. The elements are then arranged in an arrange phase, after which representations of the elements at their arranged positions and with their arranged sizes are then rendered.

Figure 5:
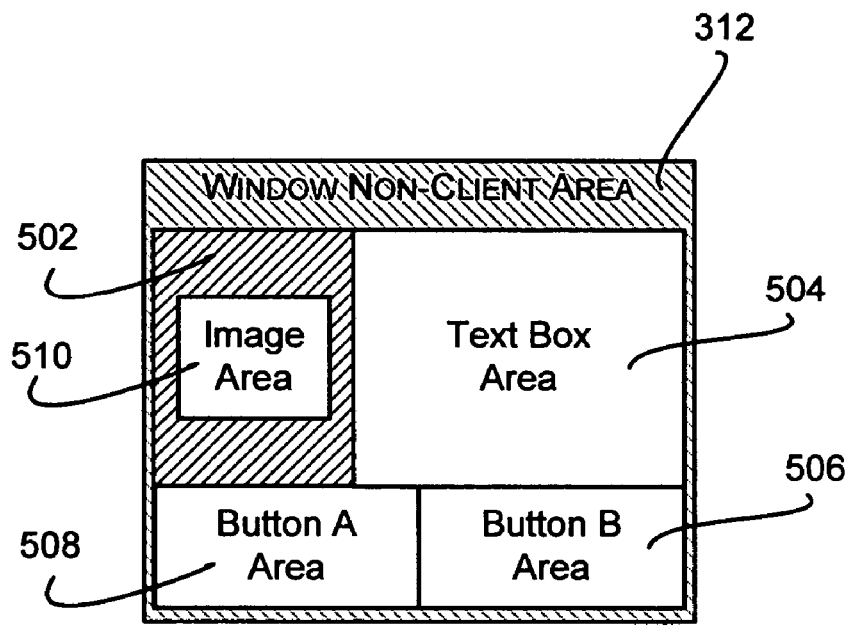
FIG. 5 is a representation of how the window sizes to the element sizes, which in turn are sized based on their content, in accordance with various aspects of the present invention.

By way of an example, consider that the child elements of FIG. 4 are rendered so as to appear as in FIG. 5. As can be seen, a panel area 502 fills the entire client area of the window, which is calculated based on the elements' desired sizes and positions. Note that each element need not be rendered in accordance with its desired size, but may, for example, be laid out in a grid-like fashion or the like, such that the rendered representation is uniform, e.g., all buttons are made the same size and evenly distributed based on the largest amount of content to render in any one button.

In this example, the panel/window client area's height is determined by the height of the text box area 504 (e.g., in pixels) plus the height of button A's area 508. The width of the panel/client area is determined by the width of the button A's area 508 plus the width of the button B's area 506. The image area 510 is centered in the remaining panel area in this example, but may be otherwise aligned.

A window size is thus computed, having a width of the total of the button widths, plus a small delta X for the window side borders, and a total height of the text box height plus the button height, plus a delta Y for the window caption area and a bottom border (the window side and bottom borders and the caption area comprise to form the window non-client area). The delta X and Y are based on the style of the window that is currently in use. Note that if the window style changes such that there are different (or no) borders and/or a window non-client area, the window size is recalculated based on the style change, as described below.

Figure 6:
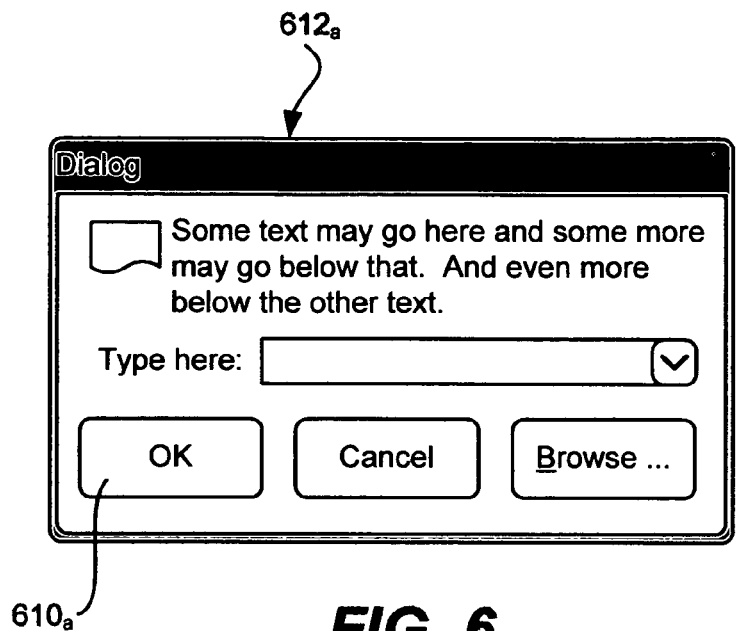
FIGS. 6 and 7 are representations of dialog windows that are sized to content, in accordance with various aspects of the present invention.
Figure 7:
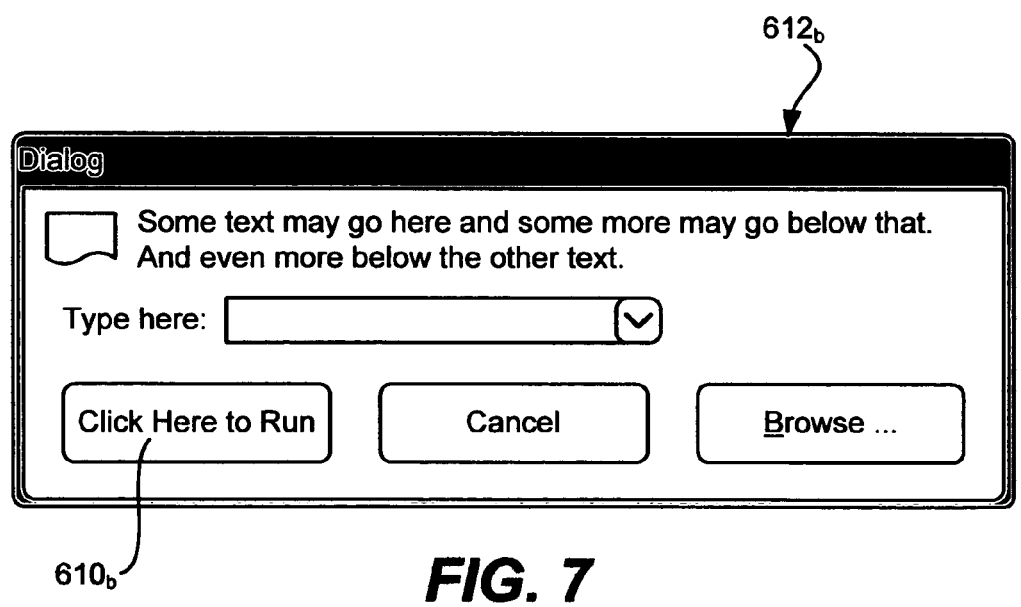

FIGS. 6 and 7 show another example, in which the same dialog layout changes "OK" content $610_a$ of a button element to "Click Here to Run" content $610_b$ of the same button element. While these examples are in the English language for purposes of readability, it can be readily appreciated that the text content may have changed from one language to another due to a change in locale, which may thus change in the amount of space needed for the translated content.

In keeping with the present invention, the size of the dialog window 612 adjusts based on the content currently being shown. In this example, the increased size needed for uniform buttons causes the width of the dialog window $612_b$ to be increased relative to the dialog window $612_a$. Note that because the text wrapped differently as a result of the horizontal increase, the height of the dialog window $612_b$ has decreased relative to that of the dialog window $612_a$.

It should be noted that a scene designer can specify which dimension or dimensions in which a window automatically resizes to content. Thus, a scene designer can specify a fixed height with a size-to-content width, a fixed width with a size-to content height, or both a size-to-content width and size-to-content width height. For example, to size both width and height, a developer provides a command such as Window.SizeToContent=WidthAndHeight.

If set in this way, subsequent commands that change the width or height are ignored while the SizeToContent property is on. However, if SizeToContent is turned on for only one dimension, the developer is free to change the other dimension at any time.

In this manner, the developer has the flexibility to treat one dimension differently from the other, which works well with certain scenarios, such as task panes. Note that in one implementation, the default value for the SizeToContent property is Manual, which means not to SizeToContent unless explicitly specified. Thus, the developer has to specify each dimension for which SizeToContent is desired.

As can be seen from the above examples, the window sizes based upon the content size, such that the entire content is visible, without any blank area. If any content's size changes, the content's containing element informs its parent in the tree, and so on up to the window element, whereby the window automatically readjusts its size to fit the changed content size, (subject to maximum and minimum constraints).

As described above, sizing the window to content is highly advantageous for localization scenarios in which content size may change from locale to locale. The present invention also provides benefits in navigation scenarios. For example, when the application navigates to different sized pages, the window will automatically resize itself to display the new page. Animation can also benefit from sizing the window to content in accordance with the present invention, e.g., when the size of content is an animated characteristic, the window's size will also be automatically animated. Note that the content may be changed in any way, e.g., a font size for text can grow or shrink even though the text itself does not change.

In one implementation, the SizeToContent property is persisted in association with the window handle, so that, for example, if the window is minimized and then restored, the window still behaves the same way. Similarly, the size-to-content remains active if the window's style changes. The SizeToContent property also overrides other window size management function calls, e.g., made by the program, including SetWindowPos, MoveWindow, SetWindowLong and ShowWindow.

If programmatic resizing of a window is desired, the scene author can explicitly turn the SizeToContent property off, and then resize. If not turned off for a given dimension, the SizeToContent property on a window thus overrides other program-specified width and/or height properties, and is restricted by maximum and minimum width and height properties.

Another way that the SizeToContent property is turned off is after certain types of user interaction manually change the size, e.g., by maximizing the window or resizing by dragging the window edge or corner. This is because a user is given the ability to manually size a window.

Turning to an explanation of the present invention, the content inside the window needs to layout when the content is first rooted inside the window, and/or when the scene designer sets the SizeToContent property after rooting the content in the window. Note that this may be based on user interaction, e.g., size to content is turned active when the user clicks a button. Layout of the content also takes place when the content's size changes after being rooted in the window.

In the event that the end user resizes the window (other than minimizing the window), the SizeToContent property is turned off, essentially giving the user the ability to manually override the automatic sizing. Note that if the program calls window sizing management APIs such as SetWindowPos, layout is updated only when SizeToContent is off.

Figure 8:
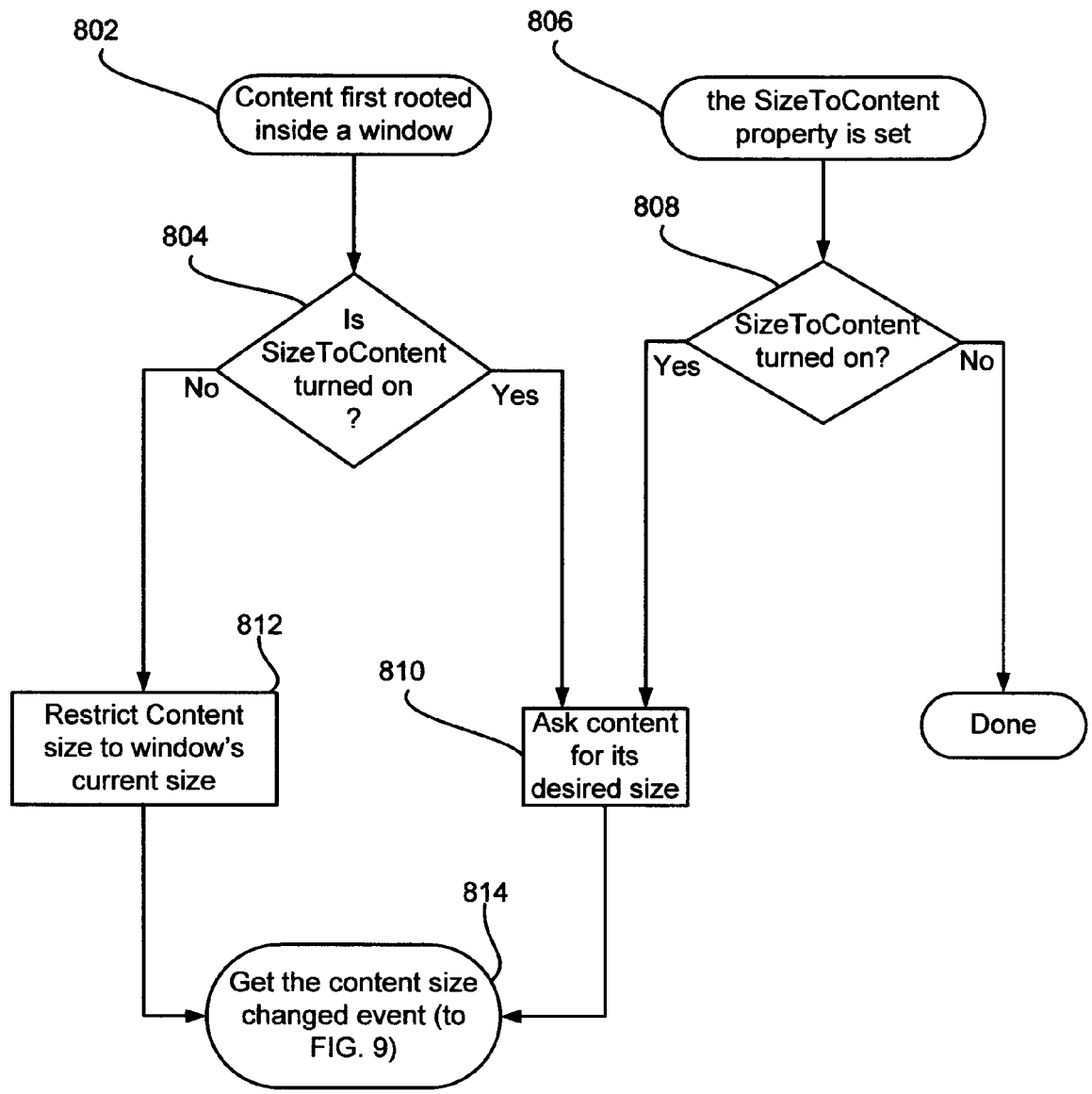
FIG. 8 is a flow diagram representing example actions taken to determine whether to size a window to content, in accordance with various aspects of the present invention.

As represented in FIG. 8, step 802, when content is first rooted in a window, the SizeToContent property is evaluated at step 804. If size to content is on, the content is asked for its desired size at step 810, to enable the calculation of the window size, as described above. Otherwise the content size is restricted to the window's size, as represented via step 812.

As represented by step 806, a notification is received when the size the SizeToContent property is set. Note that this may be because the scene designer has set the SizeToContent property after rooting the content in the window. Again, if size to content is on, as evaluated via the SizeToContent property at step 808, the content is asked for its desired size at step 810.

Essentially the content's element is called during layout, and the process waits for a return response (layout is asynchronous). A content size changed event is generally represented in FIG. 8 via step 814, which then proceeds to FIG. 9.

Figure 9:
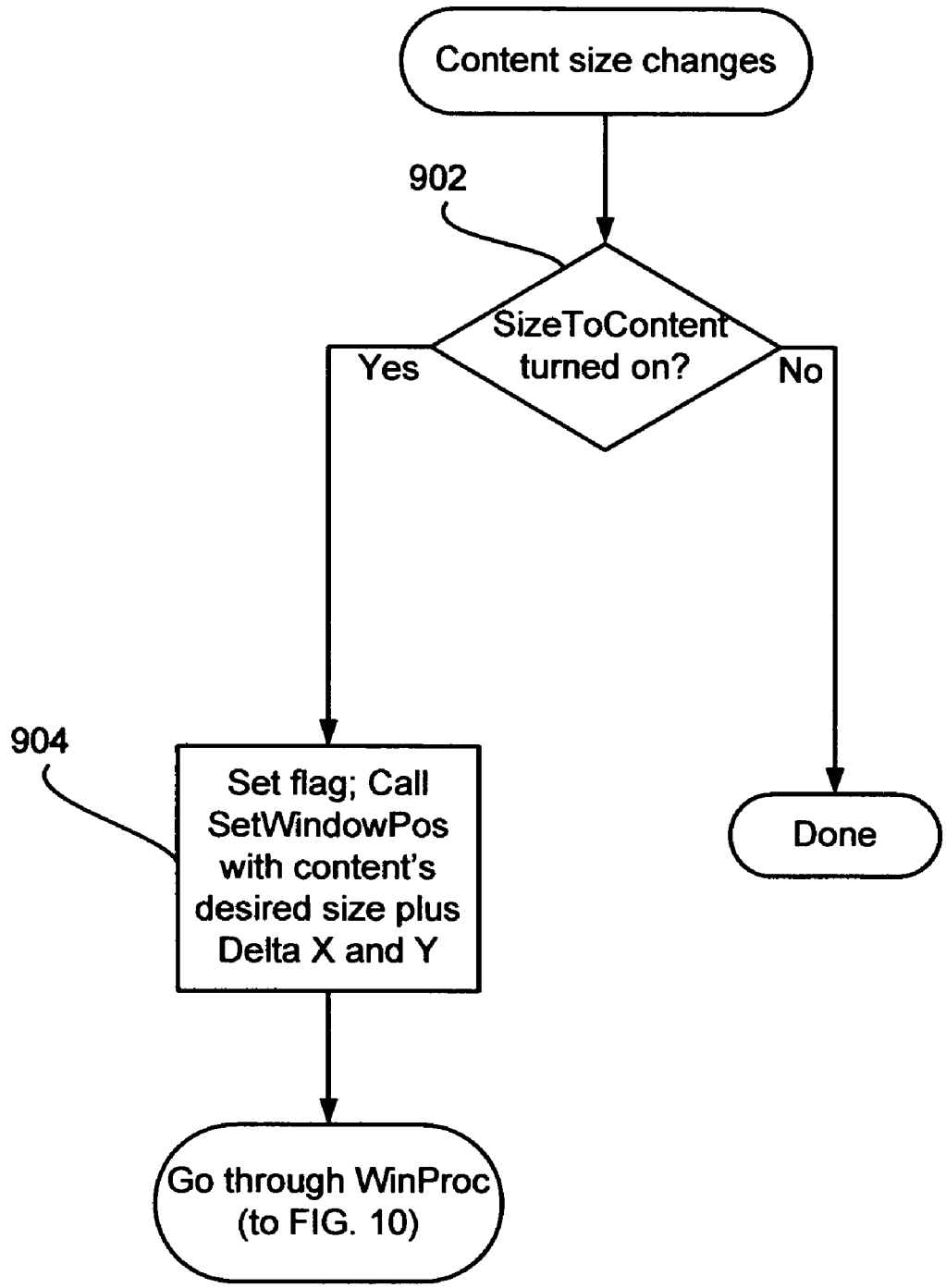
FIG. 9 is a flow diagram representing example actions taken when content size changes, in accordance with various aspects of the present invention.

FIG. 9 represents further operations when the size of content has been changed. In particular, if the SizeToContent property is on as evaluated at step 902, the process sets an internal flag and calls SetWindowPos with the desired size that the content wants plus the delta X and Y, as represented via step 904. Otherwise, nothing is done. Note that as described below, the internal flag distinguishes this code, which is in charge of resizing to content, from the program code, which may also call SetWindowPos; such a call from the program is ignored when SizeToContent property is on for any change request to its corresponding dimension (or both dimensions if both are on).

To control when to resize and when to turn the property on and off, various window messages are processed. To this end, in one implementation, the window and HwndSource's functionality build on top of a window handle (hwnd), and the hwnd window's WinProc is hooked to process the messages of interest with respect to sizing to content. In this example implementation, generally represented in FIG. 10, WinProc is called in a loop to handle the messages that are generated for the window.

More particularly, to implement size to content functionality, any WM_SYSCOMMAND, WM_SIZING, WM_WINDOWPOSCHANGING and WM_SIZE messages are processed in the hook. For WM_SYSCOMMAND, (where WPARAM wParam and LPARAM lParam are parameters), represented by the leftmost branch in FIG. 10, a window receives this message when the end user chooses a command from the window menu, or when the end user clicks on the maximize, minimize, restore or close buttons. As represented by step 1002, if the user chose a size command from the menu (wparam is SC_SIZE) or clicked on maximize (wParam is SC_MAXIMIZE), the end user is manually sizing the window, whereby the SizeToContent property is turned off at step 1004.

A WM_SIZING (WPARAM wParam LPARAM lparam) notification message, represented by the second-to-leftmost branch below the switch statement, is received by a window when the end user is resizing. It is only fired when it is user-initiated resizing, and it is the first notification that fires. This notification message is not received when it is the application program code programmatically changing the size (using win32 APIs or other presentation platform sizing APIs), whereby when received it is known that the resizing is from the end user. The SizeToContent property is thus turned off at step 1004 when this notification is received, so as to be consistent with allowing the user to manually control the window size. Note that in one implementation, this is not per dimension; that is, if only width (not height) is sizing to content, the SizeToContent property is turned off even when the user only manually changes the height. A per-dimension alternative is straightforward to implement, however.

A WM_WINDOWPOSCHANGING (WPARAM wParam LPARAM lparam) message (the second to rightmost branch of the switch statement) is received by a window when its size, position, style, or place in the Z-order is in process of changing as a result of either a call of SetWindowPos or other window management function, or in the event of an end user resizing the window. If it is the end user's resizing, the manual action to change the size is respected, and SizeToContent has already been turned off via the WM_SIZING notification that was previously received (note that the WM_SIZING notification is received and processed first). WM_GETMINMAX-INFO is a similar event, but it is not sent if the window size does not change. For example, if the size of the window does not change, but the style changes, the window's non-client area may become smaller; thus, the process needs to make sure the client area persists the SizeToContent behavior.

In general, as represented via step 1006, if the message is a result of the window sizing management function call made in FIG. 9 (with the internal flag set), and SizeToContent remains turned on, the current window style is obtained, and the size calculated with the new style if a style change is detected at step 1008. In general, the delta X and delta Y values described above may vary with the style, but the client area remains the same, based on the content size. Note that the style change may result in the content being left and top aligned with the window client area, but other alignments are feasible, and the window may be repositioned so that it appears that the content does not move following a style change.

More particularly, with respect to a possible style change, in the event that WM_WINOWPOSCHANGING was sent as a result of a style change, a WM_STYLECHANGED message is sent beforehand. The style bits, obtained by calling GetWindowStyle, are already updated to reflect the new style. AdjustWindowRectEx is called to get the size for this new style.

If lParam's flag is SWP_NOSIZE, it means it is a style or position change. If there is a style change and the window non-client area size changes as a result of the style change, the process reverts the SWP_NOSIZE flag and sets lParam's cx and cy with the content's desired size (Step 1010).

Figure 10:
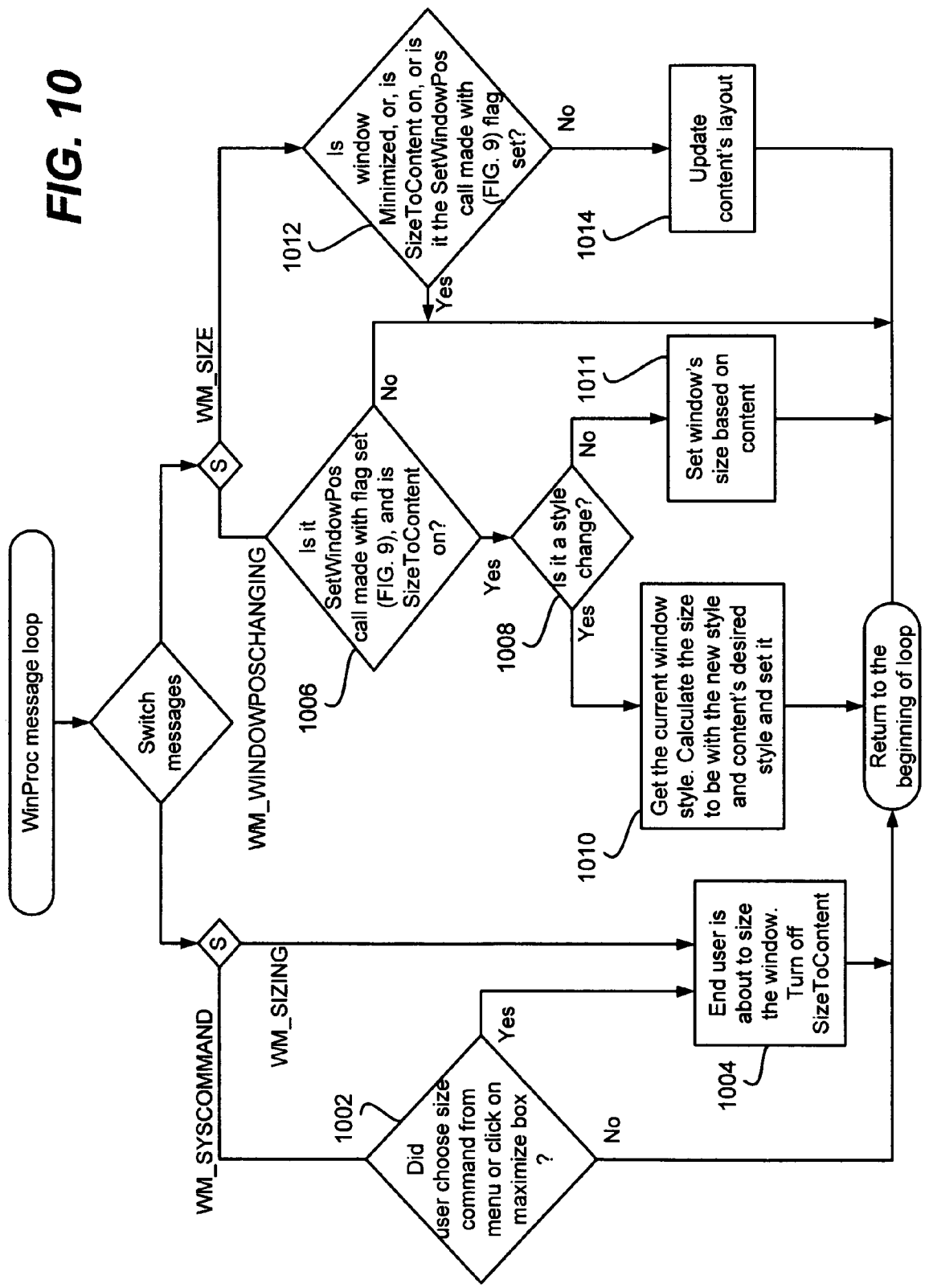
FIG. 10 is a flow diagram representing example actions related to sizing a window to content that are taken in a windows message handling loop, in accordance with various aspects of the present invention.

If the lParam's flag is not SWP_NOSIZE, it means it is a size change; the process thus updates lParam's cx and cy with content's desired size. This is represented in FIG. 10, where if not a style change, step 1011 is instead executed to set the window's size based on the content's desired size.

The rightmost branch of the switch statement represents processing the WM_SIZE (WPARAM wParam LPARAM lparam) message, which is received at a window when its size has been changed. If it is not from the window sizing management function call made by the process of FIG. 9 (as evaluated by the flag), or if SizeToContent is not on, or it is not a size change as a result of window being minimized, the process invalidates the measure of the content, and updates the layout.

In this manner, the present invention provides a window that sizes to content in an intelligent way, subject to constraints and logic/rules that properly handle changes to the content and/or the window. Note that maximum and minimum constraints may be based on a multiple monitor scenario, and if so, the present invention will allow content to size across multiple monitors if necessary. Scrollbars may be automatically added if the constraints limit the client area to something less than requested.

As can be seen from the foregoing detailed description, there is described a method and system that provide for sizing a window to content. The sizing allows a scene designer to automatically have elements fit within a window, and handles dynamic changes. The method and system thus provide numerous benefits and advantages needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method for dynamically sizing a window based on the size of content that is being displayed within the window, wherein the content being displayed within the window is represented by elements in a tree of elements with a root element representing the window, the method comprising:

providing at least two window states, said window states comprising:
a first state in which a window is automatically resized when content within the window is changed; and
a second state in which the window is not automatically resized when the content within the window is changed, wherein the window transitions from the first state to the second state when user input is received that manually alters the size of the window;
while the window is in the first state:
displaying the window with a size that is based on the content within the window;
detecting a change in the size of a portion of the content within the window, wherein the portion of the window is contained within a child element of the window;
obtaining size information from the child element, wherein the size information is based on the size of the portion of the content contained within the child element;
adjusting a size parameter of the window based on the size information obtained from the child element; and
resizing the window to the size parameter such that the display of the window is resized to fit the changed content; and
after transitioning the window to the second state in response to receiving user input that manually alters the size of the window;
detecting a change in the size of a portion of the content within the window; and
abstaining from resizing the window such that the size of the window remains the same even though the portion of the content within the window has changed.

2. The method of claim 1 wherein the child element comprises a container having a plurality of child elements below the container, and further comprising, computing the size information based on other size information corresponding to the child elements below the container.

3. The method of claim 2 wherein at least one child element below the container comprises a type of element of a set, the set containing, a text-related element, an image-related element, a button element, a text box element, a listbox element, a checkbox element, and another window.

4. The method of claim 1 wherein the size of content represented by the child element is changed, and further comprising:
for the duration of the first state in which the window is automatically sized based on the content within the window, obtaining new size information and further adjusting the size parameter of the element based on the new size information; and
for the duration of the second state in which the window is not automatically sized based on the content within the window, maintaining the current size of the window.

5. At least one computer-readable storage media storing computer-executable instructions, which when executed perform the method of claim 1.

6. At least one computer-readable storage media storing computer-executable instructions, which when executed perform steps, comprising:
displaying a window with a size that is based on content within the window;
detecting a change in the size of a portion of the content within the window, wherein the portion of the window is contained within a child element of the window;
detecting that a SizeToContent parameter of the window is set indicating that the window should be resized to its content;
obtaining size information from the child element, wherein the size information is based on the size of the portion of the content contained within the child element;
adjusting a size parameter of the window based on the size information obtained from the child element;
resizing the window to the size parameter such that the display of the window is resized to fit the changed content;
receiving user input that manually alters the size of the window;
updating the SizeToContent parameter to indicate that the window should not be resized to its content;

detecting a change in the size of a portion of the content within the window;

accessing the SizeToContent parameter to determine whether to resize the window based on the change in the size of the portion of the content; and abstaining from resizing the window because the SizeToContent parameter indicates that the window should not be resized to its content such that the size of the window remains the same even though the portion of the content within the window has changed.

7. The computer-readable storage media of claim 6 further comprising while the SizeToContent parameter is set, animating the content to change the content, wherein the window automatically resizes based on the changed content.

8. The computer-readable storage media of claim 6 wherein the SizeToContent parameter also includes one or more parameters for indicating that the size of the window should only be adjusting in one dimension, and wherein resizing the window comprises adjusting the window size in only one dimension as specified by the one or more parameters.

9. The computer-readable storage media of claim 6 wherein sizing the window comprises computing a size based on the content and a style of the window, wherein the change of style of a window results in computing a new size.

10. The computer-readable storage media of claim 6 wherein automatically resizing the window comprises processing a window message that indicates when the content has changed.

11. The computer-readable storage media of claim 6 wherein the window automatically resizes based on a property of the window, and further comprising processing window messages to control the state of the property.

12. The computer-readable storage media of claim 11 further comprising, providing a mechanism by which user interaction toggles the state of the property.

13. The computer-readable storage media of claim 12 wherein the mechanism is independent of a program that requested the window.

14. The computer-readable storage media of claim 6 further comprising, limiting the window size based on at least one size constraint, and providing at least one scrollbar corresponding to the limiting of the window size.

15. A method for resizing a window to its contents and for controlling when the window resizes to its contents comprising:

displaying a window with a size that is based on content within the window;

detecting a change in the size of a portion of the content within the window, wherein the portion of the window is contained within a child element of the window;

detecting that a SizeToContent parameter of the window is set indicating that the window should be resized to its content;

obtaining size information from the child element, wherein the size information is based on the size of the portion of the content contained within the child element;

adjusting a size parameter of the window based on the size information obtained from the child element;

resizing the window to the size parameter such that the display of the window is resized to fit the changed content;

receiving user input that manually alters the size of the window;

updating the SizeToContent parameter to indicate that the window should not be resized to its content;

detecting a change in the size of a portion of the content within the window;

accessing the SizeToContent parameter to determine whether to resize the window based on the change in the size of the portion of the content; and abstaining from resizing the window because the SizeToContent parameter indicates that the window should not be resized to its content such that the size of the window remains the same even though the portion of the content within the window has changed.

16. The method of claim 15, wherein the SizeToContent parameter includes one or more parameters for specifying that the window should only be resized in either the horizontal or vertical direction, and wherein resizing the window comprises resizing the window in either the horizontal or vertical direction based on the state of the one or more parameters.

* * * * *